(12) United States Patent  
Birkbeck et al.

(10) Patent No.: US 9,542,741 B2
(45) Date of Patent: Jan. 10, 2017

(54) METHOD AND SYSTEM FOR AUTOMATIC PELVIS UNFOLDING FROM 3D COMPUTED TOMOGRAPHY IMAGES

(71) Applicant: Siemens Healthcare GmbH, Erlangen (DE)

(72) Inventors: Neil Birkbeck, Sunnyvale, CA (US); Dijia Wu, North Brunswick, NJ (US); Michal Sofka, Franklin Park, NJ (US); Meizhu Liu, New York, NY (US); Grzegorz Soza, Heroldsberg (DE); Shaohua Kevin Zhou, Plainsboro, NJ (US); Clifford R. Weiss, Baltimore, MD (US); Atilla Peter Kiraly, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 14/178,583

(22) Filed: Feb. 12, 2014

(65) Prior Publication Data

US 2015/0228070 A1    Aug. 13, 2015

(51) Int. Cl.
*G06K 9/00* (2006.01)
*G06T 7/00* (2006.01)
*G06T 19/00* (2011.01)

(52) U.S. Cl.
CPC .......... *G06T 7/0012* (2013.01); *G06T 7/0079* (2013.01); *G06T 7/0083* (2013.01); *G06T 19/00* (2013.01); *G06T 2207/10081* (2013.01); *G06T 2207/20164* (2013.01); *G06T 2207/30008* (2013.01); *G06T 2210/41* (2013.01); *G06T 2219/021* (2013.01)

(58) Field of Classification Search
CPC combination set(s) only.
See application file for complete search history.

(56) References Cited

U.S. PATENT DOCUMENTS

| 7,916,919 | B2  | 3/2011  | Zheng et al. |
| 7,970,190 | B2* | 6/2011  | Steinle ................... A61B 19/52 128/922 |
| 8,457,710 | B2* | 6/2013  | Biglieri ................ A61B 5/0555 600/407 |
| 8,538,117 | B2  | 9/2013  | Najarian et al. |
| 8,861,818 | B2* | 10/2014 | Ito ...................... A61B 17/1746 382/128 |
| 2005/0182320 | A1* | 8/2005 | Stifter .................... A61B 5/103 600/429 |
| 2007/0106282 | A1* | 5/2007 | Lavallee ............ A61B 19/5244 606/1 |

(Continued)

OTHER PUBLICATIONS

Dijia Wu, et. al. ("A Learning Based Deformable Template Matching Method for Automatic Rib Centerline Extraction and Labeling in CT Images", Computer Vision and Pattern Recognition (CVPR), 2012 IEEE Conference on IEEE, Jun. 16, 2012, pp. 980-987).*

(Continued)

*Primary Examiner* — Anand Bhatnagar (57) ABSTRACT

A method and system for automatic pelvis unfolding from 3D computed tomography (CT) images is disclosed. A 3D medical image, such as a 3D CT image, is received. Pelvis anatomy is segmented in the 3D medical image. The 3D medical image is reformatted to visualize an unfolded pelvis based on the segmented pelvis anatomy.

31 Claims, 5 Drawing Sheets

(56) References Cited

U.S. PATENT DOCUMENTS

| | | | |
|---|---|---|---|
| 2008/0056433 A1* | 3/2008 | Steinle | A61B 19/52 378/4 |
| 2008/0139921 A1* | 6/2008 | Biglieri | A61B 5/0555 600/410 |
| 2008/0212871 A1* | 9/2008 | Dohmen | G06T 7/0067 382/154 |
| 2010/0030532 A1 | 2/2010 | Arora et al. | |
| 2010/0128953 A1 | 5/2010 | Ostrovsky-Berman | |
| 2010/0145231 A1* | 6/2010 | Takahashi | A61B 5/1075 600/587 |
| 2011/0007954 A1* | 1/2011 | Suehling | G06K 9/00362 382/128 |
| 2011/0077500 A1* | 3/2011 | Shakiba | A61B 1/303 600/409 |
| 2011/0125016 A1* | 5/2011 | Lazebnik | A61B 5/1075 600/443 |
| 2011/0161058 A1* | 6/2011 | Schottdorf | A61B 6/04 703/1 |
| 2012/0141008 A1 | 6/2012 | Ringl | |
| 2012/0143037 A1 | 6/2012 | Najarian et al. | |
| 2013/0079676 A1* | 3/2013 | Hermle | A61B 19/5244 600/587 |
| 2013/0114785 A1 | 5/2013 | Alzen et al. | |
| 2013/0216110 A1 | 8/2013 | Zheng et al. | |
| 2014/0233820 A1* | 8/2014 | Wu | A61B 6/505 382/131 |

OTHER PUBLICATIONS

Wolf I, et al., "Curved Reformations Using the Medical Imaging Interaction Toolkit (MITK)", Proceedings of SPIE, SPIE, US, Jan. 1, 2005, pp. 831-838, vol. 5744.

Heiko Seim et al, "Automatic Segmentation of the Pelvic Bones from CT Data Based on a Statistical Shape Model", VCBM 08: Eurographics Workshop on Visual Computing for Biomedicine Proceedings, Oct. 6, 2008, pp. 93-100.

Dija Wu, et al., "A Learning Based Deformable Template Matching Method for Automatic Rib Centerline Extraction and Labeling in CT Images", Computer Vision and Pattern Recognition (CVPR), 2012 IEEE Conference on IEEE, Jun. 16, 2012, pp. 980-987.

Gilles B, et al., "Musculoskeletal MRI Segmentation Using Multi-Resolution Simplex Meshes with Medial Representations", Medical Image Analysis, Oxford University Press, Jun. 1, 2010, pp. 291-302, vol. 14, No. 3, Oxford, GB.

Grady, "Random Walks for Image Segmentation", IEEE Transactions on Pattern Analysis and Machine Intelligence, IEEE Computer Society, Nov. 1, 2006, pp. 1768-1783, vol. 27, No. 11, USA.

European search report issued in corresponding European patent application No. 15154875.7-1502/2908290, issued Nov. 30, 2015.

* cited by examiner

METHOD AND SYSTEM FOR AUTOMATIC PELVIS UNFOLDING FROM 3D COMPUTED TOMOGRAPHY IMAGES

BACKGROUND OF THE INVENTION

The present invention relates to pelvic bone visualization, and more particularly, to automatically reformatting 3D medical image data to visualize the pelvic bone.

High resolution computed tomography (CT) volumes of the abdomen are typically used to diagnose abnormalities in the pelvic bone, such as bone lesions or fractures. Current technology provides CT volumes with hundreds of axial slices and through evaluation of the pelvis can be a tedious and error prone task due to the complex structure of the pelvis which usually occupies multiple slices in the volume data. In order to examine the pelvis in the CT scan, a radiologist must scroll through all of the axial slices in a CT volume in order to look for abnormalities in the pelvis. In typically takes about 14 minutes on average for a radiologist to examine a pelvis image through axial slices.

BRIEF SUMMARY OF THE INVENTION

The present invention provides a method and system for automatic pelvis unfolding from 3D computed tomography (CT) images. Embodiments of the present invention automatically detects and segments the pelvis in a 3D CT image and then unfolds the pelvis by reformatting the 3D CT image to generate a new image that provides an improved visualization of the pelvis.

In one embodiment, a 3D medical image is received. Pelvis anatomy is segmented in the 3D medical image. The 3D medical image is reformatted to visualize an unfolded pelvis based on the segmented pelvis anatomy.

These and other advantages of the invention will be apparent to those of ordinary skill in the art by reference to the following detailed description and the accompanying drawings.

DETAILED DESCRIPTION

The present invention is directed to a method for automatic pelvis unfolding from three dimensional (3D) computed tomography (CT) images. Embodiments of the present invention are described herein to give a visual understanding of the automatic pelvis unfolding method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
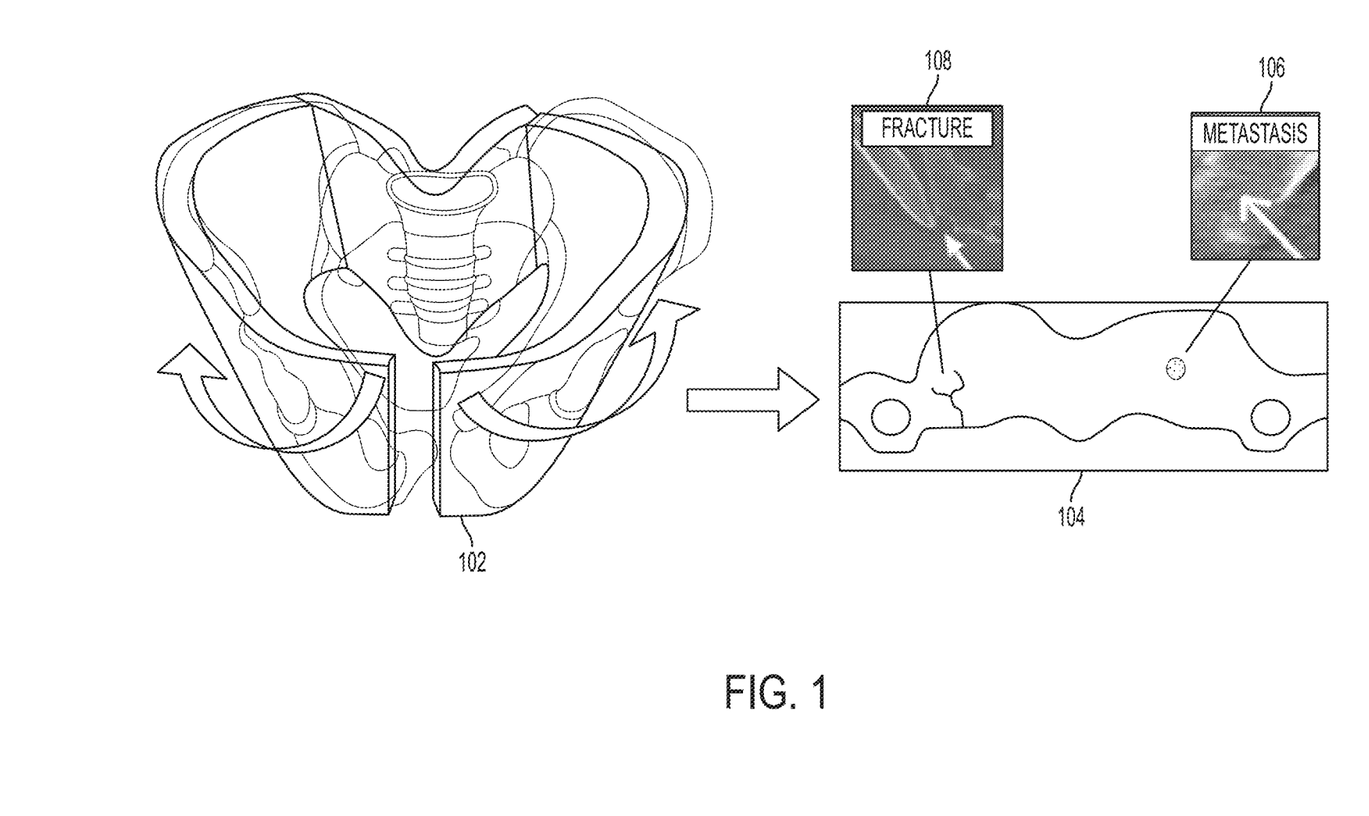
FIG. 1 illustrates an example of pelvis unfolding according to an embodiment of the present invention.

Embodiments of the present invention provide method and system for pelvic bone visualization. The pelvis is automatically detected and segmented in a 3D CT image. A surface is extracted from the segmented pelvis and unfolded in a reformatted image that provides an improved visualization of the pelvis. For example, a medial surface of the pelvis may be extracted and unfolding to a two-dimensional (2D) image. FIG. 1 illustrates an example of pelvis unfolding according to an embodiment of the present invention. As shown in FIG. 1, a surface 102 of the pelvis is extracted from a 3D CT image and the surface 102 is unfolded into a reformatted image 104 that provides an improved visualization of the pelvis. The reformatted image 104 allows a radiologist to quickly examiner the pelvis to locate metastases 106 and fractures 108 in oncology or trauma applications, respectively.

Figure 2:
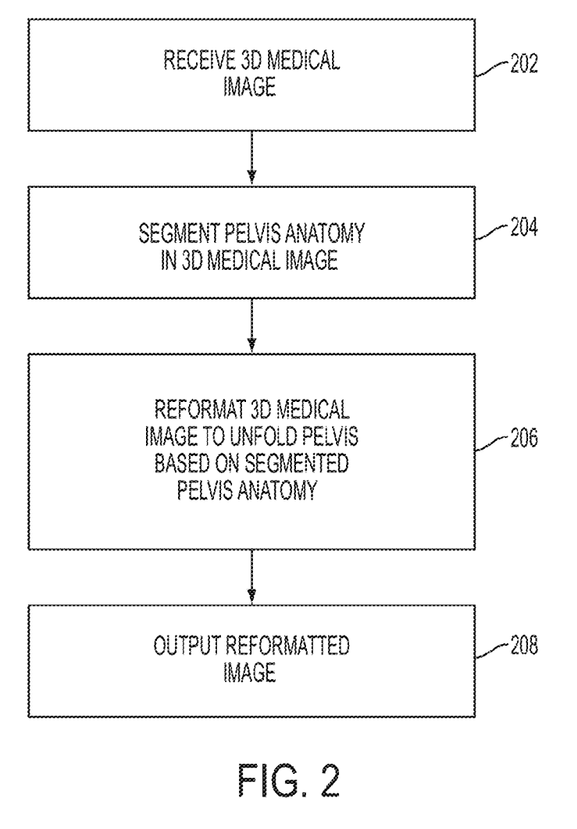
FIG. 2 illustrates a method for automatic pelvis unfolding according to an embodiment of the present invention.

FIG. 2 illustrates a method for automatic pelvis unfolding according to an embodiment of the present invention. The method of FIG. 2 transforms medical image data representing a patient's pelvis anatomy to generate a reformatted image that provides an improved visualization of the pelvis. At step 202, a 3D medical image is received. In an advantageous implementation, the 3D medical image is a 3D CT image, but the present invention is not limited thereto and other imaging modalities, such a magnetic resonance imaging (MRI), may be used as well. The 3D medical image may be received directly from an image acquisition device, such as a CT scanner. It is also possible that the 3D medical image is received by loading a stored 3D medical image data from a memory or storage of a computer system.

At step 204, the pelvis anatomy is segmented in the 3D medical image. According to various implementations, the whole pelvis may be segmented in the 3D medical image or a portion of the pelvis anatomy, such as a mesh slab, may be segmented in the 3D medical image. Various segmentation methods may be used to segment the pelvis anatomy in the 3D medical image, including learning based methods, atlas based methods, and model fitting methods.

In one embodiment, marginal space learning (MSL) may be used to segment the pelvic bone in the 3D medical image. For a given volume I, the pelvis is first detected from the volume by searching for the optimal similarity transformation parameters or pose parameters including translation $t=(t_x,t_y,t_z)$, orientation $r=(r_x,r_y,r_z)$, and anisotropic scaling $s=(s_x,s_y,s_z)$. The pose estimation task can be formulated by maximizing the posterior probability as follows:

$$(\hat{t}, \hat{r}, \hat{s}) = \underset{t,r,s}{\mathrm{argmax}} P(t, r, s \mid I). \qquad (1)$$

Solving equation (1) directly involves a search in nine dimensional parameter space, which can be computationally expensive in practice. Accordingly, an efficient inference scheme, marginal space learning (MSL), can be utilized to decompose the whole search space into a series of marginal search spaces. MSL-based 3D object detection estimates the position, orientation, and scale of the target anatomical structure in the 3D medical image data using a series of discriminative classifiers trained using annotated training data. For example, a method for MSL-based heart chamber segmentation is described in detail in U.S. Pat. No. 7,916,919, issued Mar. 29, 2011, and entitled "System and Method for Segmenting Chambers of a Heart in a Three Dimensional Image", which is incorporated herein by reference. In order to efficiently localize an object using MSL, parameter estimation is performed in a series of marginal spaces with increasing dimensionality. Accordingly, the idea of MSL is not to learn a classifier directly in the full similarity transformation space, but to incrementally learn classifiers in the series of marginal spaces. As the dimensionality increases, the valid space region becomes more restricted by previous marginal space classifiers. Accordingly, instead of searching for all parameters simultaneously, MSL decomposes the search space into subsequent estimates of 3D searches over position, orientation, and scale. That is, the detection of the pose parameters is split into three steps: object position estimation, position-orientation estimation, and fully similarity transformation estimation:

$$(\hat{t}, \hat{r}, \hat{s}) \approx \mathrm{argmax}_t P(t \mid I), \mathrm{argmax}_r P(r \mid I, \hat{t}), \mathrm{argmax}_s P(s \mid I, \hat{t}, \hat{r}). \quad (2)$$

After each step, only a limited number of best candidates are kept to reduce the search space and speed up the inference. A separate discriminative classifier is trained based on annotated training data for each of these steps. In the position estimation step, a trained position classifier is used to detect a set of most likely position candidates in the current medical image data. In the position-orientation estimation step, a trained position-orientation classifier searches number of plausible orientations at each of the position candidates to detect a set of most likely position-orientation candidates. In the full similarity transformation estimation step, a trained position-orientation-scale classifier searches number of plausible scales at each of the position-orientation candidates to detect a set of most likely position-orientation-scale candidates. For each of the discriminative classifiers (position, position-orientation, and position-orientation-scale), a probabilistic boosting tree (PBT) classifier may be trained based on the training data. 3D Haar features can be used to train the position classifier and steerable features can be used to train the position-orientation classifier and the position-orientation-scale classifier. Once a mesh representing the pelvic bone boundary is aligned to the 3D medical image by estimating the pose parameters (r,s,t), the mesh can be refined using a trained boundary classifier. The trained boundary classifier (e.g., a PBT classifier) searches along the normal direction from each mesh vertex for a point within the search range most likely to be on the pelvic bone boundary, and the adjustment moves the mesh vertex to the detected point.

Figure 3:
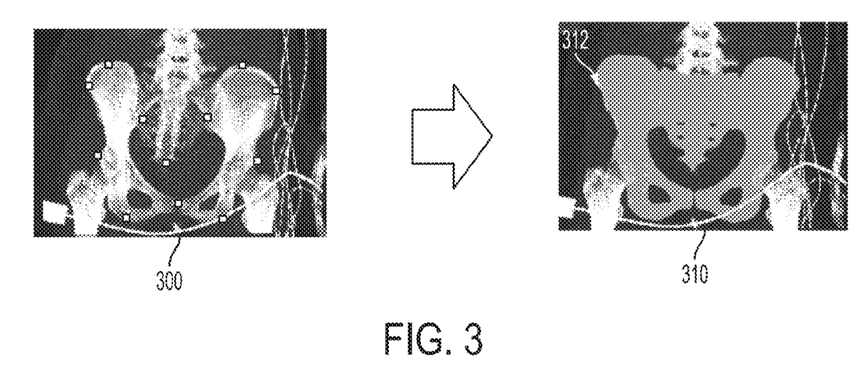
FIG. 3 illustrates an exemplary pelvis segmentation results using a learned statistical shape model.

In another embodiment, the pelvis can be segmented in to 3D medical image using a learned statistical shape model. In this embodiment, a statistical shape model of the pelvis is constructed from manually segmented pelvic bones, including the ischium, illium, and pubis, in a set of training images. A set of anatomical landmarks can be automatically detected in the 3D medical image using trained landmark detectors, using principal component analysis (PCA), the anatomical landmarks can be used to fit the statistical shape model of pelvis to the 3D medical image in order to initialize a pelvis shape in the 3D medical image. The pelvis can then be automatically segmented by refining the initialized pelvis shape using random walker refinement. FIG. 3 illustrates an exemplary pelvis segmentation results using a learned statistical shape model. As shown in FIG. 3, image 300 shows anatomical landmarks detected in a 3D CT image. Image 310 shows a segmented pelvis 312 in the 3D CT image, segmented by initializing a pelvis shape by fitting a statistical shape model of the pelvis to the 3D CT image using the anatomical landmarks and then refining the pelvis shape using random walker refinement.

In another embodiment, a mesh slab representing a portion of the pelvis anatomy can be segmented in the 3D medical image. The mesh slab represents a surface within the pelvis. The mesh slab can be created by fitting splines across certain key points of the pelvis, such as points on the pubic bone, iliac crests, posterior superior iliac spine, femoral head, ischial tuberosity, and ischium. In a possible implementation, the mesh slab can be segmented in the 3D medical image using an atlas based image registration approach. This approach utilizes a database of one or more 3D volumes and corresponding mesh slabs. Image registration methods register two images by determining a deformation field which deforms one image to best fit its structures into the shape of the other image. A collection of pelvis images with manually of semi-automatically fit mesh slabs is created offline. Although a database of pelvis images and corresponding mesh slabs is described herein, it is to be understood that even a single stored image may be used. The mesh slab for each image in the database can be created by placing control points around the pelvis and fitting splines in between them to ensure smoothness. Another approach for creating the mesh slab is to segment the pelvis and then perform a homotopy-preserving thinning until the segmented pelvis mesh is reduced to a plate-like structure. The plate-like structure can then be smoothed and extended outside the pelvis, and used to directly define a mesh. Since the mesh is explicitly defined, smoothness and distortion constrains can be satisfied.

Once a database of images and mesh slabs is established, a deformable registration can be applied between the received 3D medical image and any of the images in the database. This step can be repeated for each image in the database until a good image match is found (e.g., image in the database with the smallest deformation between the database image and the received 3D medical image). The mesh slab corresponding to the selected database image is used to define the mesh slab in the 3D medical image. The 3D medical image can function as either a fixed or moving image. In the case of the moving image, the 3D medical image can be sampled into the space of the image in the database and the mesh re-sampling can be applied to the deformed moving image. In the case in which the 3D medical image functions as a fixed image, the deformation field is applied in reverse so that the mesh in the database can be converted to the space of the 3D medical image. In both cases, the deformation field given by the registration and the mesh must be a diffeomorphism to ensure that a mapping back to the original image and vice-versa is possible.

In another implementation, a model fitting approach can be used to segment the mesh slab in the 3D medical image. This approach involves detecting key points in the image and fitting a mathematical model to the key points. For example, anatomical landmarks of the pelvis can be detected in the 3D medical image. For example, points on the pubic bone, iliac crests, posterior superior iliac spine, femoral head, ischial tuberosity, and ischium can be detected in the 3D medical image. The anatomical landmarks can be detected automatically using trained anatomical landmarks detectors (e.g., PBT classifiers). It is also possible that the landmarks be manually detected by a user, such as a radiologist. Once these anatomical landmarks are detected, a geometric object, such as a cone, can be fit to the landmarks. Alternatively, a spline can be fit to the landmarks such that it is within most of the pelvis. Next, the structure is thickened by adding uniformly placed points to the mesh. Note that multiple splines must be used to define a surface.

The mesh slab can also be defined in the 3D medical image by first segmenting the pelvis (e.g., using MSL or statistical shape model segmentation) and then performing a homotopy-preserving thinning resulting in a thin-plate structure. The edges of the thin-plate structure can be extended to reach just outside of the pelvis. Next, the plate is converted directly into a mesh and then layers of uniformly place points are added to thicken the mesh. Alternatively, a geometric structure can be fit to the plate, such as a section of a 3D cone.

Returning to FIG. 2, at step 206, the 3D medical image is reformatted to unfold the pelvis based on the segmented pelvis anatomy. In particular, a surface within the pelvis is defined based on the segmented pelvis anatomy and the 3D medical image is reformatted to unfold that surface. The 3D medical image is reformatted by sampling along the surface and mapping the sampled points to a 2D plane or to a reformatted image volume. For example, the sampled points can be mapped to the reformatted image using thin-plate spline warping.

Figure 4:
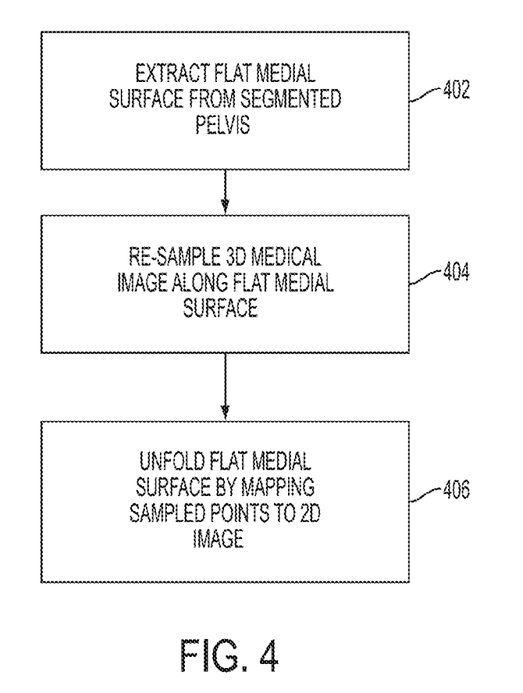
FIG. 4 illustrates a method of unfolding the pelvis using a flat medial surface according to an embodiment of the present invention.
Figure 5:
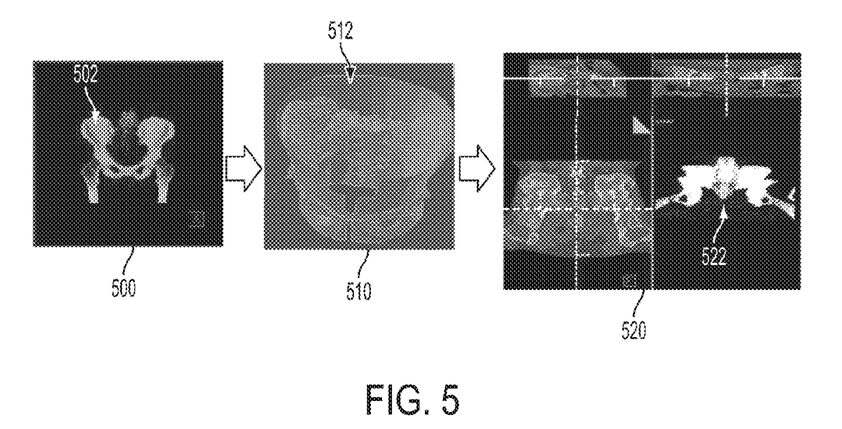
FIG. 5 illustrates exemplary results of the method of FIG. 4.

FIG. 4 illustrates a method of unfolding the pelvis using a flat medial surface according to an embodiment of the present invention. The method of FIG. 4 can be used in an exemplary embodiment to implement step 206 of FIG. 2. At step 402, a flat medial surface is extracted from the segmented pelvis anatomy. The flat medial surface is a 2D surface fit within the segmented pelvis anatomy. Once a pelvis mesh is segmented (e.g., using MSL or learned statistical model based segmentation), the flat medial surface is extracted by fitting a 2D surface within the segmented pelvis mesh to minimize a combined distance from all mesh points to the surface. In addition to fitting the medial surface to minimize the total distance from all of the mesh points, the surface fitting can also be subject to smoothness constraints in order to extract a smooth medial surface. FIG. 5 illustrates exemplary results of the method of FIG. 4. As shown in FIG. 5, image 500 illustrates a segmented pelvis 502 in a 3D CT image and image 510 illustrates a flat medial surface 512 fit to the segmented pelvis.

Returning to FIG. 4, at step 404, the 3D medical image is re-sampled along the flat medial surface. In particular, once the 2D flat medial surface is fit to the segmented pelvis anatomy, points of the 3D medical image that intersect with the 2D flat medial surface are sampled. At step 406, the flat medial surface is unfolded by mapping the sampled points along the flat medial surface in the 3D medical image to a 2D image. According to an exemplary implementation, thin-plate spline warping can be used to map the sampled points from the 3D medical image to a 2D image. This results in a 2D reformatted image that provides a visualization of the unfolded flat medial surface of the pelvis. As shown in FIG. 5, image 520 shows a 2D reformatted image 522 obtained using thin-plate spline warping that provides a visualization of the unfolded medial surface of the pelvis.

Figure 6:
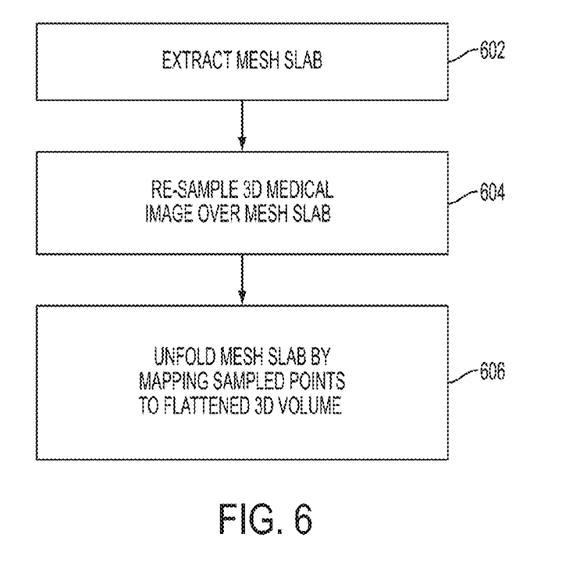
FIG. 6 illustrates a method of unfolding the pelvis using a mesh slab fit to the pelvis according to an embodiment of the present invention.

FIG. 6 illustrates a method of unfolding the pelvis using a mesh slab fit to the pelvis according to an embodiment of the present invention. The method of FIG. 6 can be used in another exemplary embodiment to implement step 206 of FIG. 2. At step 602, a mesh slab is extracted. The mesh slab is a 3D surface fit to the pelvis anatomy in the 3D medical image. It is to be understood that the mesh slab may be directly segmented in the 3D medical image in the pelvis anatomy segmentation step (step 204 of FIG. 2). For example, the mesh slab may be segmented using the atlas based image registration approach or the model fitting approach described above. It is also possible that a mesh of the whole pelvis anatomy is segmented in step 204 of FIG. 2 (e.g., using MSL or statistical shape model based segmentation), and the mesh slab is extracted from the mesh of the whole pelvis anatomy. In particular, the mesh slab can be extracted by performing a homotopy-preserving thinning on the pelvis mesh resulting in a thin-plate structure. The edges of the thin-plate structure can be extended to reach just outside of the pelvis. Next, the plate can be converted directly into a mesh and then layers of uniformly place points are added to thicken the mesh. Alternatively, a geometric structure can be fit to the plate, such as a section of a 3D cone.

At step 604, the 3D medical image is re-sampled over the mesh slab. In particular, points of the 3D medical image that intersect with the 3D mesh slab surface are sampled. At step 606, the mesh slab is unfolded by mapping the sampled points over the mesh slab in the 3D medical image to a flattened 3D volume. The flattened volume is a reformatted volume that includes a small number of slices corresponding to the thickness of the mesh slab, and each slice of the reformatted volume provides a visualization of the unfolded mesh slab. According to an exemplary implementation, thin-plate spline warping can be used to map the sampled points from the 3D medical image to a reformatted flattened volume.

Returning to FIG. 2, at step 208, the reformatted image is output. The reformatted image can be output by displaying the reformatted image on a display device of a computer system. This provides a user, such as a physician or a radiologist, a visualization of an unfolded portion of the pelvis, which allows the user to quickly diagnose abnormalities, such as metastases and fractures, in the pelvis. The reformatted image may also be output by storing the reformatted image on a storage or memory of a computer system.

Figure 7:
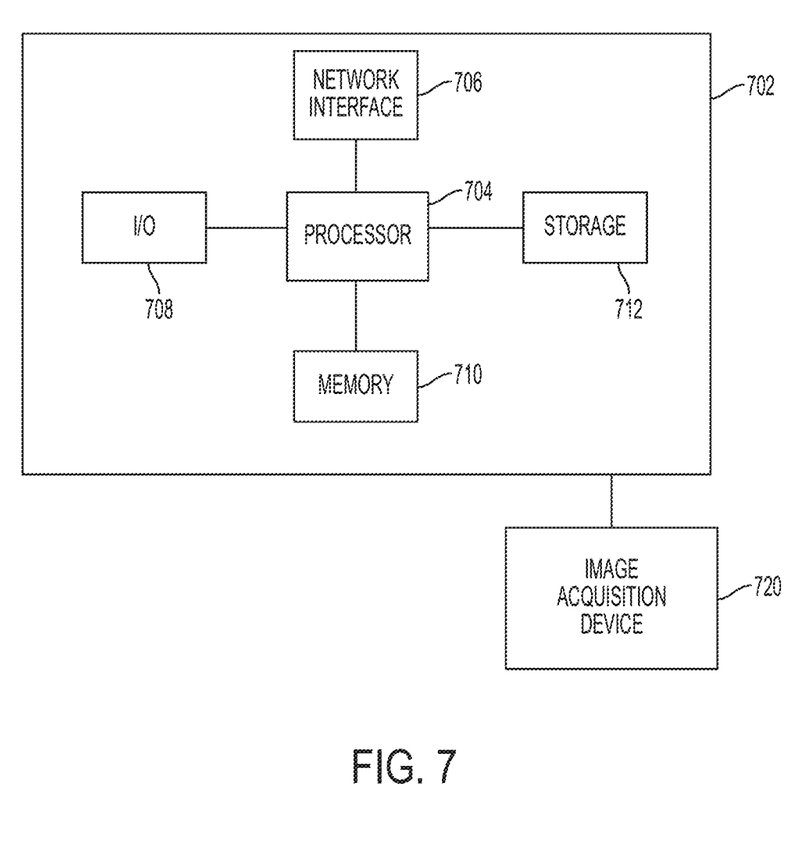
FIG. 7 is a high level block diagram of a computer capable of implementing the present invention.

The above-described methods for automatic pelvis unfolding from a 3D medical image may be implemented on a computer using well-known computer processors, memory units, storage devices, computer software, and other components. A high level block diagram of such a computer is illustrated in FIG. 7. Computer 702 contains a processor 704 which controls the overall operation of the computer 702 by executing computer program instructions which define such operation. The computer program instructions may be stored in a storage device 712 (e.g., magnetic disk) and loaded into memory 710 when execution of the computer program instructions is desired. Thus, the steps of the methods of FIGS. 2, 4, and 6 may be defined by the computer program instructions stored in the memory 710 and/or storage 712 and controlled by the processor 704 executing the computer program instructions. An image acquisition device 720, such as a CT or MR scanning device, can be connected to the computer 702 to input the 3D images (volumes) to the computer 702. It is possible to implement the image acquisition device 720 and the computer 702 as one device. It is also possible that the image acquisition device 720 and the computer 702 communicate wiredly or wirelessly through a network. The computer 702 also includes one or more network interfaces 706 for communicating with other devices via a network. The computer 702 also includes other input/output devices 708 that enable user interaction with the computer 702 (e.g., display, keyboard, mouse, speakers, buttons, etc.) One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for automatic pelvis unfolding from a 3D medical image, comprising:
   receiving a 3D medical image;
   segmenting pelvis anatomy in the 3D medical image; and
   reformatting the 3D medical image to visualize an unfolded pelvis based on one of a flat medial surface that is a 2D surface fit within the segmented pelvis anatomy or a mesh slab fit to the pelvis in the 3D medical image.

2. The method of claim 1, wherein reformatting the 3D medical image to visualize an unfolded pelvis based on one of a flat medial surface that is a 2D surface fit within the segmented pelvis anatomy or a mesh slab fit to the pelvis in the 3D medical image comprises:
   extracting the flat medial surface from the segmented pelvis anatomy;
   sampling points along the flat medial surface in the 3D medical image; and
   unfolding the flat medial surface by mapping the sampled points along the flat medial surface in the 3D medical image to a 2D image.

3. The method of claim 2, wherein the segmented pelvis anatomy comprises a segmented mesh of the pelvis anatomy and extracting the flat medial surface from the segmented pelvis anatomy comprises:
   fitting a 2D surface to the segmented mesh of the pelvis anatomy to minimize a combined distance from all of a plurality of mesh points of the segmented mesh to the 2D surface.

4. The method of claim 2, wherein the segmented pelvis anatomy comprises a segmented mesh of the pelvis anatomy and extracting the flat medial surface from the segmented pelvis anatomy comprises:
   fitting a 2D surface to the segmented mesh of the pelvis anatomy to minimize a combined distance from all of a plurality of mesh points of the segmented mesh to the 2D surface subject to a smoothness constraint.

5. The method of claim 2, wherein unfolding the flat medial surface by mapping the sampled points along the flat medial surface in the 3D medical image to a 2D image comprises:
   mapping the sampled points along the flat medial surface in the 3D medical image to the 2D image using thin-plate spline warping.

6. The method of claim 1, wherein segmenting pelvis anatomy in the 3D medical image comprises:
   segmenting the pelvis anatomy using marginal space learning (MSL)-based segmentation.

7. The method of claim 1, wherein segmenting pelvis anatomy in the 3D medical image comprises:
   detecting a plurality of anatomical landmarks of the pelvis in the 3D medical image;
   detecting an initial pelvis segmentation by fitting a learned statistical shape model to the 3D medical image based on the detected anatomic landmarks; and
   refining the initial pelvis segmentation using random walker refinement.

8. The method of claim 1, wherein segmenting pelvis anatomy in the 3D medical image comprises:
   segmenting the mesh slab fit to the pelvis in the 3D medical image.

9. The method of claim 8, wherein segmenting the mesh slab fit to the pelvis in the 3D medical image comprises:
   detecting a plurality of pelvis landmarks in the 3D medical image; and
   fitting a surface around the detected pelvis landmarks.

10. The method of claim 8, wherein reformatting the 3D medical image to visualize an unfolded pelvis based on one of a flat medial surface that is a 2D surface fit within the segmented pelvis anatomy or a mesh slab fit to the pelvis in the 3D medical image comprises:
    sampling points over the mesh slab in the 3D medical image; and
    unfolding the mesh slab by mapping the sampled points over the mesh slab in the 3D medical image to a flattened volume.

11. The method of claim 8, wherein segmenting the mesh slab fit to the pelvis in the 3D medical image comprises:
    registering the 3D medical image to a stored 3D medical image resulting in a deformation field; and
    segmenting the mesh slab in the 3D medical image by mapping a stored mesh slab associated with the stored 3D medical image to the 3D medical image using the deformation field.

12. The method of claim 11, wherein registering the 3D medical image to a stored 3D medical image resulting in a deformation field comprises:
    registering the 3D medical image with each of a plurality stored 3D images in a database resulting in plurality of deformation fields; and
    selecting one of the plurality of stored 3D images having the smallest deformation field.

13. The method of claim 1, further comprising:
    displaying the reformatted image providing visualization of the unfolded pelvis.

14. The method of claim 1, wherein the 3D medical image is a 3D computed tomography (CT) image.

15. An apparatus for automatic pelvis unfolding from a 3D medical image, comprising:
    a processor; and
    a memory storing computer program instructions, which when executed by the processor cause the processor to perform operations comprising:
    receiving a 3D medical image;
    segmenting pelvis anatomy in the 3D medical image; and
    reformatting the 3D medical image to visualize an unfolded pelvis based on one of a flat medial surface that is a 2D surface fit within the segmented pelvis anatomy or a mesh slab fit to the pelvis in the 3D medical image.

16. The apparatus of claim 15, wherein reformatting the 3D medical image to visualize an unfolded pelvis based on one of a flat medial surface that is a 2D surface fit within the segmented pelvis anatomy or a mesh slab fit to the pelvis in the 3D medical image comprises:
    extracting the flat medial surface from the segmented pelvis anatomy;
    sampling points along the flat medial surface in the 3D medical image; and
    unfolding the flat medial surface by mapping the sampled points along the flat medial surface in the 3D medical image to a 2D image.

17. The apparatus of claim 15, wherein segmenting pelvis anatomy in the 3D medical image comprises:
    segmenting the mesh slab fit to the pelvis in the 3D medical image.

18. The apparatus of claim 17, wherein reformatting the 3D medical image to visualize an unfolded pelvis based on one of a flat medial surface that is a 2D surface fit within the segmented pelvis anatomy or a mesh slab fit to the pelvis in the 3D medical image comprises:
    sampling points over the mesh slab in the 3D medical image; and
    unfolding the mesh slab by mapping the sampled points over the mesh slab in the 3D medical image to a flattened volume.

19. The apparatus of claim 15, wherein the operations further comprise:
    displaying the reformatted image providing visualization of the unfolded pelvis.

20. A non-transitory computer readable medium storing computer program instructions for automatic pelvis unfolding from a 3D medical image, the computer program instructions when executed on a processor cause the processor to perform operations comprising:
    receiving a 3D medical image;
    segmenting pelvis anatomy in the 3D medical image; and
    reformatting the 3D medical image to visualize an unfolded pelvis based on one of a flat medial surface that is a 2D surface fit within the segmented pelvis anatomy or a mesh slab fit to the pelvis in the 3D medical image.

21. The non-transitory computer readable medium of claim 20, wherein reformatting the 3D medical image to visualize an unfolded pelvis based on one of a flat medial surface that is a 2D surface fit within the segmented pelvis anatomy or a mesh slab fit to the pelvis in the 3D medical image comprises:
    extracting the flat medial surface from the segmented pelvis anatomy;
    sampling points along the flat medial surface in the 3D medical image; and
    unfolding the flat medial surface by mapping the sampled points along the flat medial surface in the 3D medical image to a 2D image.

22. The non-transitory computer readable medium of claim 21, wherein the segmented pelvis anatomy comprises a segmented mesh of the pelvis anatomy and extracting the flat medial surface from the segmented pelvis anatomy comprises:
    fitting a 2D surface to the segmented mesh of the pelvis anatomy to minimize a combined distance from all of a plurality of mesh points of the segmented mesh to the 2D surface.

23. The non-transitory computer readable medium of claim 21, wherein the segmented pelvis anatomy comprises a segmented mesh of the pelvis anatomy and extracting the flat medial surface from the segmented pelvis anatomy comprises:
    fitting a 2D surface to the segmented mesh of the pelvis anatomy to minimize a combined distance from all of a plurality of mesh points of the segmented mesh to the 2D surface subject to a smoothness constraint.

24. The non-transitory computer readable medium of claim 21, wherein unfolding the flat medial surface by mapping the sampled points along the flat medial surface in the 3D medical image to a 2D image comprises:
    mapping the sampled points along the flat medial surface in the 3D medical image to the 2D image using thin-plate spline warping.

25. The non-transitory computer readable medium of claim 20, wherein segmenting pelvis anatomy in the 3D medical image comprises:
    segmenting the pelvis anatomy using marginal space learning (MSL)-based segmentation.

26. The non-transitory computer readable medium of claim 20, wherein segmenting pelvis anatomy in the 3D medical image comprises:
    detecting a plurality of anatomical landmarks of the pelvis in the 3D medical image;
    detecting an initial pelvis segmentation by fitting a learned statistical shape model to the 3D medical image based on the detected anatomic landmarks; and
    refining the initial pelvis segmentation using random walker refinement.

27. The non-transitory computer readable medium of claim 20, wherein segmenting pelvis anatomy in the 3D medical image comprises:
    segmenting the mesh slab fit to the pelvis in the 3D medical image.

28. The non-transitory computer readable medium of claim 27, wherein segmenting the mesh slab fit to the pelvis in the 3D medical image comprises:
    registering the 3D medical image to a stored 3D medical image resulting in a deformation field; and
    segmenting the mesh slab in the 3D medical image by mapping a stored mesh slab associated with the stored 3D medical image to the 3D medical image using the deformation field.

29. The non-transitory computer readable medium of claim 27, wherein segmenting the mesh slab fit to the pelvis in the 3D medical image comprises:
    detecting a plurality of pelvis landmarks in the 3D medical image; and
    fitting a surface around the detected pelvis landmarks.

30. The non-transitory computer readable medium of claim 27, wherein reformatting the 3D medical image to visualize an unfolded pelvis based on one of a flat medial surface that is a 2D surface fit within the segmented pelvis anatomy or a mesh slab fit to the pelvis in the 3D medical image comprises:
    sampling points over the mesh slab in the 3D medical image; and
    unfolding the mesh slab by mapping the sampled points over the mesh slab in the 3D medical image to a flattened volume.

31. The non-transitory computer readable medium of claim 20, wherein the operations further comprise:
    displaying the reformatted image providing visualization of the unfolded pelvis.

\* \* \* \* \*